Patented Feb. 10, 1953

2,628,238

UNITED STATES PATENT OFFICE 2,628,238

(DIMETHOXYMETHYL) SUCCINIC ANHYDRIDE AND TELOMERIC PRODUCTS

Tracy M. Patrick, Jr., Dayton, Ohio, assignor to Monsanto Chemical Company, St. Louis, Mo., a corporation of Delaware No Drawing. Application February 25, 1952, Serial No. 273,337

9 Claims. (Cl. 260—342.4)

This invention relates to novel compositions obtained by the free radical induced interaction of methylal with maleic anhydride.

More specifically this invention relates to the discovery that methylal can be reacted with maleic anhydride in the presence of a free radical promoting agent to produce (dimethoxymethyl)-succinic anhydride and telomeric products.

The definitions pertaining to "telomers" and "telomerization" are to be found in U. S. Patent 2,440,800, wherein said terms were defined so as to provide adequate means for distinguishing reactions such as those as herein-disclosed from conventional polymerization reactions.

The novel compositions of the instant invention can be diagrammatically shown by the formula:

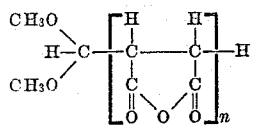

wherein $n$ is an integer from 1 to 20.

The molar ratio of methylal to maleic anhydride can range from about 0.1:1 to about 10:1, depending on whether the telomeric composition or the 1:1 adduct is the preferred product. However, ratios outside these limits are operable, but impractical and without any advantages to offset handling the excess reactants. Where the (dimethoxymethyl) succinic anhydride is desired, it is preferred that a molar excess of the methylal be employed. Whereas, molar ratios wherein the methylal is present in an excess up to 10 mole equivalents or higher are applicable, it is preferred that the methylal be present in a molar excess up to about 5 mole equivalents, and more preferably still the molar ratio of about 2:1 to about 3:1 obviates the handling of excess methylal and provides good yields of the (dimethoxymethyl) succinic anhydride. Conversely, where the telomeric compositions are desired, that is, compositions wherein $n$ is an integer greater than one, the maleic anhydride is employed in molar excess.

The term "free radical promoting agent" as used herein embraces ultraviolet radiation and the peroxygen-type catalysts, exemplified by the peroxides, hydroperoxides and peresters, such as hydrogen peroxide, tertiary butyl peroxide, acetyl peroxide, propionyl peroxide, butyryl peroxide, lauroyl peroxide, benzoyl peroxide, tertiary butyl hydroperoxide, tertiary butyl perbenzoate, tertiary butyl diperphthalate, and the like. The peroxygen-type catalysts or mixtures thereof are generally employed at from about 0.1 to about 5 per cent and preferably from about 0.25 to about 2.5 per cent by weight, based on the reactants. The peroxygen-type catalyst can be added all at once, in increments or continuously over a period of time. Also, as hereinafter more fully shown, the peroxygen-type catalyst can be employed in the presence of ultraviolet radiation whereby the catalysts are photochemically decomposed, such that the free radical reaction can be initiated at substantially lower temperatures than when the peroxygen-type catalyst is employed alone.

The temperature employed in the process of this invention can range from about —50° C. to the decomposition point of the reactants, but the range of from about 25 to about 150° C. is preferred and the range from about 50 to about 100° C. is more specifically preferred. In general, the temperature should be selected such that the free radical promoting catalyst is decomposed at a moderate rate during the course of the reaction. For example, if benzoyl peroxide is the principal catalyst, the temperature should preferably range from about 60° C. to about 90° C.

Since methylal is a relatively volatile compound, it is necessary that the reaction be brought about in a pressure vessel when the higher temperatures are employed. Normally, the reaction is then brought about at the autogeneric pressure. Superatmospheric pressure can also be employed by pressuring with an inert atmosphere, as for example, nitrogen. However, the pressuring media should be substantially free of oxygen since large amounts of oxygen inhibit the telomerization reaction.

The time required to produce satisfactory yields of the (dimethoxymethyl) succinic anhydride and telomeric compositions is dependent upon the temperature and free radical promoting agents employed. Accordingly, it is clear that under the various conditions disclosed herein the time should be sufficient to provide a substantial yield of the desired product.

The free radical induced reaction of this invention can be brought about by the direct mixing of the reactants as shown in the examples below, can be brought about in the presence of an inert organic solvent, e. g., benzene, 1,4-dioxane, diphenyl ether and the like, or either reactant can be added stepwise to the other reactant throughout the course of the reaction. Where the latter method is employed the stepwise addition of methylal to maleic anhydride will favor the formation of telomeric compositions and conversely the formation of (dimethoxymethyl) succinic anhydride will be favored.

Where the former stepwise process is used it is preferable that the maleic anhydride be dissolved in an inert solvent, or the process conducted above the melting point of the maleic anhydride such that the maleic anhydride is present in the liquid state, but solid maleic anhydride can be added directly to the methylal, if desired. Proper agitation should be maintained during the course of the reaction to provide adequate mixing of the reactants, as for example, refluxing, stirring, rocking, passing an inert gas through the system, and the like.

The following examples are illustrative, but not limitive of the present invention:

*Example 1*

A mixture of 76.0 g. (1.0 mole) of redistilled methylal and 73.5 g. (0.75 mole) of maleic anhydride was introduced into a reaction vessel fitted with a reflux condenser. The mixture was then brought to reflux (55° C.) and 0.5 g. of benzoyl peroxide added thereto. After about 19 hours at reflux the reaction mixture was cooled to 30° C. and 2.0 cc. of a 25 per cent solution of acetyl peroxide in dimethyl phthalate was introduced. Thereafter the reaction mixture was again heated to reflux. During the course of the reaction two additional 0.5 g. samples of benzoyl peroxide were added to the refluxing reaction mixture. Refluxing was discontinued after 20 days at which time the reflux temperature was 76.5° C.

The reaction mixture was then distilled through a Vigreux fractionating column and the unreacted methylal and maleic anhydride were recovered. The reaction product was redistilled through a 2-foot Vigreux and 47.0 g. of a cut having a boiling point of 115 to 117° C. at 12 mm. mercury pressure, $n_D^{25}$ 1.4460, and $$d_{25}^{25}$$

1.1797 was obtained. Whereas no effort was made to work up the reaction mixture quantitatively the aforesaid refined cut represents a yield of 49 per cent. This product was identified as (dimethoxymethyl)succinic anhydride.

Calculated for $C_7H_{10}O_5$ _____ C, 48.27; H, 5.79
Found _____ C, 48.66; H, 5.80

In addition to the 1:1 adduct 16.4 g. of a dark brown viscous telomeric composition was obtained.

*Example 2*

A mixture of 91.3 g. (1.2 moles) of methylal, 39.2 g. (0.4 mole) of maleic anhydride, and 2.6 g. of 2,2-bis(tert-butylperoxy)butane containing about 30 per cent di-tert.-butyl peroxide was introduced into a reaction vessel. A 100-watt ultraviolet lamp contained in a quartz tube was immersed in the solution and the current was turned on. No external heat was applied during the reaction, the sole source of energy being derived from the ultraviolet lamp. The temperature of the solution rose from 20 to 65° C. during the course of the 3.75-hour reaction period. The reaction mixture was then stripped of methylal and the balance of the mixture was distilled through a fractionating column to recover the unreacted maleic anhydride and the reaction products, identified as (dimethoxymethyl)succinic anhydride and the telomeric composition.

*Example 3*

A small stainless steel bomb was charged with a mixture of 68.5 g. (0.9 mole) of redistilled methylal, 29.4 g. (0.3 mole) of maleic anhydride, and 1.95 g. of 2,2-bis-(tert.-butylperoxy)butane containing approximately 30 per cent di-tert.-butyl peroxide. The bomb was sealed, placed in a rocker, heated to 120° C. under autogenic pressure conditions, and held thereat for 24 hours. Thereafter heating and rocking was stopped and the bomb allowed to cool. Then the bomb was opened and the reaction mixture transferred to a distilling flask fitted with a fractionating column. After recovery of the unreacted methylal and maleic anhydride the reaction products, identified as (dimethoxymethyl)succinic anhydride and the telomeric composition, were obtained in a weight ratio of about 2 to 1.

*Example 4*

A mixture of 228 g. (3 moles) of redistilled methylal, 98 g. (1 mole) of maleic anhydride, and 6.5 g. of 2,2-bis(tert.-butylperoxy)butane containing approximately 30 per cent di-tert.-butyl peroxide was charged to the glass line of a bomb reactor. The bomb was sealed, cooled in dry ice, the gas phase evacuated with a water aspirator, and then pressured to 10 p. s. i. g. with with nitrogen. The evacuation and pressuring of the bomb was repeated three times, then the bomb was placed in a rocker and heat applied. The bomb was heated to 120° C. under autogenic pressure conditions and held thereat for about 45 hours. Then heating and rocking were stopped, the bomb allowed to cool, opened, and the reaction mixture transferred to a distilling flask fitted with a fractionating column. The unreacted methylal and maleic anhydride were recovered and the reaction products identified as (dimethoxymethyl)succinic anhydride and the telomeric composition were obtained. Whereas no effort was made to obtain quantitative yields, a yield of 33.8 per cent of the 1:1 adduct and a 25.4 weight per cent conversion, on a 1:1 basis, of the telomeric composition were obtained.

The (dimethoxymethyl)succinic anhydride has utility as an intermediate for the production of a host of heterocyclic compounds. For example, the aforesaid compound can be esterified to provide the various succinates, which latter class of compounds can then be hydrolyzed to provide the formyl succinates. Other compounds can be prepared by the hydrolysis of the (dimethoxymethyl)succinic anhydride, whereby the compound is decarboxylated and ring closure is brought about with lactone formation. In a similar manner many other heterocyclic compounds can be prepared.

Whereas, as aforesaid, the value of $n$ can be an integer from 2 to 20 for the telomeric compositions. The range of from 2 to 5 is generally preferred where the isolated telomer is desired. However, the mixed telomeric compositions are suitable for many purposes without separation into their component parts. Thus, the average value of $n$ will generally be a mixed number greater than 2. The telomeric compositions of this invention are particularly suitable as lubricants, lubricant additives, and the like.

I claim:

1. The compounds having the formula:

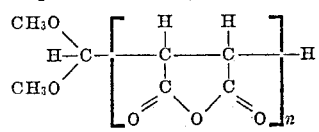

wherein $n$ is an integer from 1 to 20.

2. The compound (dimethoxymethyl) succinic anhydride.

3. The telomeric composition having the formula:

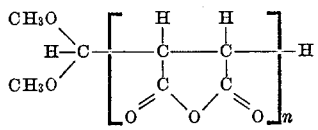

wherein $n$ is an integer from 2 to 5.

4. The process of preparing a compound having the formula:

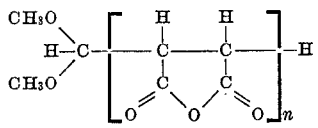

wherein $n$ is an integer from 1 to 20, comprising the reaction of methylal with maleic anhydride in the presence of a free radical promoting agent selected from the group consisting of peroxygen-type catalysts and ultraviolet radiation and mixtures thereof.

5. The process of preparing (dimethoxymethyl) succinic anhydride comprising the reaction of a molar excess of methylal with maleic anhydride in the presence of from about 0.1 to about 5 per cent, based on the weight of the reactants, of a peroxygen-type catalyst.

6. The process of preparing (dimethoxymethyl) succinic anhydride comprising the reaction of a molar excess of methylal with maleic anhydride in the presence of from about 0.1 to about 5 per cent, based on the weight of the reactants, of a peroxygen-type catalyst and ultraviolet radiation.

7. The process of preparing (dimethoxymethyl) succinic anhydride comprising the reaction of a molar excess of methylal with maleic anhydride in the presence of ultraviolet radiation.

8. The process of preparing (dimethoxymethyl) succinic anhydride comprising the reaction of a molar excess of up to about 5 mole equivalents of methylal with one mole equivalent of maleic anhydride in the presence of from about 0.1 to about 5 per cent, based on the weight of reactants, of a peroxygen-type catalyst at a temperature from about 50 to about 150° C. and fractionating the reaction mixture to recover the (dimethoxymethyl) succinic anhydride.

9. The process of preparing telomeric compositions having the formula:

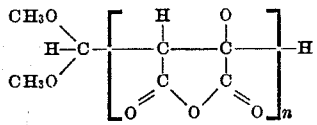

wherein $n$ is a number from 2 to 20, comprising the reaction of a molar excess of up to about 5 mole equivalents of maleic anhydride with one mole equivalent of methylal in the presence of from about 0.1 to about 5 per cent, based on the weight of reactants, of a peroxygen-type catalyst at a temperature from about 50 to about 150° C. and fractionating the reaction mixture to separate the telomeric composition.

TRACY M. PATRICK, Jr.

No references cited.